United States Patent [19]

Kojima et al.

[11] 4,366,142

[45] Dec. 28, 1982

[54] METHOD AND APPARATUS FOR THE PREPARATION OF SLAKED LIME SOLUTION

[76] Inventors: Sadao Kojima, 4-27-4, Mejirodai, Hachioji-shi, Tokyo; Masaaki Shimada, 15-1, Sanuka-machi 2-chome, Iwaki-shi, Fukushima-ken; Kunio Sakai, 4-1, Sagiuchi, Nishiki-machi, Iwaki-shi, Fukushima-ken; Katuo Horie, 59, Odakatakamatsu, Nakosos-machi, Iwaki-shi, Fukushima-ken, all of Japan

[21] Appl. No.: 134,051

[22] Filed: Mar. 26, 1980

[30] Foreign Application Priority Data

| Mar. 28, 1979 | [JP] | Japan | 54-36614 |
| Sep. 21, 1979 | [JP] | Japan | 54-121665 |
| Nov. 1, 1979 | [JP] | Japan | 54-141888 |
| Nov. 1, 1979 | [JP] | Japan | 54-141889 |
| Nov. 1, 1979 | [JP] | Japan | 54-141890 |

[51] Int. Cl.³ .................................... C01F 11/02
[52] U.S. Cl. ........................ 423/640; 23/293 R; 422/225; 422/228
[58] Field of Search ............... 423/640, 155, 164

[56] References Cited

U.S. PATENT DOCUMENTS

| 479,130 | 7/1892 | Allert . | |
| 1,152,769 | 9/1915 | Trent . | |
| 1,780,821 | 11/1930 | Henderson | 423/640 |
| 3,879,287 | 4/1975 | Porter . | |
| 4,005,016 | 1/1977 | Haese et al. . | |

FOREIGN PATENT DOCUMENTS 1925770 11/1969 Fed. Rep. of Germany .

OTHER PUBLICATIONS

Boynton, *Chemistry and Technology of Lime and Limestone*, Interscience Publishers (1966), pp. 290, 291, 322–331.

Perry, *Chemical Engineers' Handbook*, Third Edition, McGraw-Hill Book Company, Inc. (1950), p. 1203.

*Primary Examiner*—O. R. Vertiz
*Assistant Examiner*—Wayne A. Langel
*Attorney, Agent, or Firm*—Fleit & Jacobson

[57] ABSTRACT

This invention relates to an apparatus for the continuous preparation of aqueous solution of slaked lime solids with fresh water. The apparatus comprises a main vessel having an inverted truncated cone including a smallest and closed bottom. There is provided a dispenser for supplying material slaked lime solids to said main vessel at or nearly at the top end thereof from above, and a constant headed fresh water reservoir for supplying fresh water to the main vessel at a place selected therein in close proximity to the smallest bottom through a piping. A flow rate adjusting means is arranged in this piping. At least a mechanical or fluid agitator is provided at a close proximity to the vessel bottom. Means for the take-up of the formed product solution in an overflowing manner from the main vessel is provided at the top thereof.

6 Claims, 6 Drawing Figures

METHOD AND APPARATUS FOR THE PREPARATION OF SLAKED LIME SOLUTION

BACKGROUND OF THE INVENTION

This invention relates to a method and an apparatus for the continuous preparation of aqueous solution of slaked lime. Although not limitative, such aqueous solution is broadly used for adjusting pH values in the city water main lines so as to avoid the formation of iron rust. As an alternative use of such aqueous solution, it is used for adding calcium ions to artificially regenerated fresh water from sea water.

As the pH-modifier for city water mains, caustic potash has been broadly used. Recently, however, in place of the potash, slaked lime is increasingly utilized, because the latter is capable of forming a kind of stable protective layer on the inside wall surfaces of city water iron pipe lines.

However, there is a grave difficulty in the use of slaked lime which is rather difficult to dissolve in water. Inadvantageous local deposits or the like are liable to form on the inside wall surfaces of the city main pipe lines. Thus, for using slaked slime for this purpose, a large capacity of reservation tank is necessary to provide a chance of supplying clear aqueous solution of slaked lime.

In last decade, continuously operable apparatus for the production of aqueous slaked lime solution have been proposed and found their gradually increased usage.

As a generalized representative apparatus used for the above purpose, it comprises a tank or vessel, the interior space thereof being, however, separated at a lower level into two by a separating wire net arranged to place thereon the material slaked lime forming a relatively thick layer. The water for the wanted aqueous slaked lime solution is constantly supplied preferably at a predetermined constant rate to the place in close proximity of the tank bottom, while the thus formed saturated product solution is constantly taken out from the preparation tank at the top thereof.

It has been found that for several initial hours of the lime-dissolving operation, such plants work substantially satisfactorily. With lapse of further time, however, the concentration of the product solution will decrease gradually, on account of such phenomenon that a number of relatively large liquid passages are formed through the solids material layer and the sizes of these passages will become still larger with further continued time of the dissolving operation.

It will thus be seen that the water may pass through these gradually enlarged liquid passages and without intimate contact with the solids material.

Another difficulty is caused by clogging of the passage openings of the solids-supporting wire net as appearing in an extended use of the plant for at least several months. More specifically, a small amount of sand or the like insoluble particles contained in the material solids will gradually accumulate at the openings of the wire net. On the other hand, the city water may include unavoidably certain amount of iron rust or the like insoluble solid particles which give rise also to net clogging. Further, a slight amount of free acid(s) may be included in the material water which may react with $Ca(OH)_2$ formed in the solution to $CaCO_3$, thereby providing liably clogging of the wire net openings.

The invention has its object to provide an efficiently operable apparatus adapted for the continuous formation of normally saturated liquid solution of slaked lime, without inviting above mentioned several conventional drawbacks, especially without use of the solids-supporting wire net means, and in a highly stable manner for an extended period of time.

The invention relates further to a process for the continuous preparation of the above kind.

SUMMARY OF THE INVENTION

In terms of the apparatus according to this invention, one or more of main vessels intended for the desired preparation has its variable sectional area which seen along its central axis. For this purpose, the vessel is so designed and arranged that its main portion including the bottom end has an inverted and turncated hollow cone in which at least an agitator of either of the mechanical or fluid type is provided at a close proximity of the closed end of the main vessel. Substantially same level or so, at least an outlet opening for supplying fresh water to the vessel is provided so as to its delivery end correctly or at a lower level close to the agitator. The formed product solution is taken out from the vessel and at its top end, preferably in an overflowing manner.

As will be clear from the foregoing, the main vessel acting as main element of the apparatus according to the invention, the cross-sectional area is the smallest at the bottom of the vessel, and it increases gradually when seen upwards along the central axis of the main vessel. The already or liably deposited solids on the closed smallest bottom end of the vessel may be subjected, in this way, heaviest agitation which may be carried into effect, preferably and normally from the beginning of the dissolving operation. However, if the material solids are fine, the agitator may be started only after a certain initial time period, say several hours, counted from the initiation of the dissolving operation.

The material fresh water is fed at a place in close proximity of the closed vessel bottom and preferably at a constant supply rate, while clear, normally saturated product liquid solution is constantly taken out from the vessel and at the top end thereof.

The agitator may normally started to operate only after certain initial period when a decrease in the concentration of product solution will have been noted.

According to the experiments, the peripheral rotational speed of the agitator, if the latter is of the mechanical one, may normally be less than 1 m/sec., most preferably less than 0.5 m/sec. On the other hand, the water velocity supplied at close proximity to the vessel bottom may be less than 2 mm/sec, most preferably lower than 1 mm/sec, when measured at the top end of the main vessel. In this way, the an excessively large overall height of the main vessel may be avoided without loss of efficient dissolving performance.

These and further objects, features and advantages of the present invention will become more apparent when read the following detailed description of the invention to be set forth in connection with the accompanying drawings, in which

DETAILED DESCRIPTION OF THE INVENTION

Referring now to the drawings, showing several preferred embodiments of the invention, the latter will be described in detail.

Figure 1:
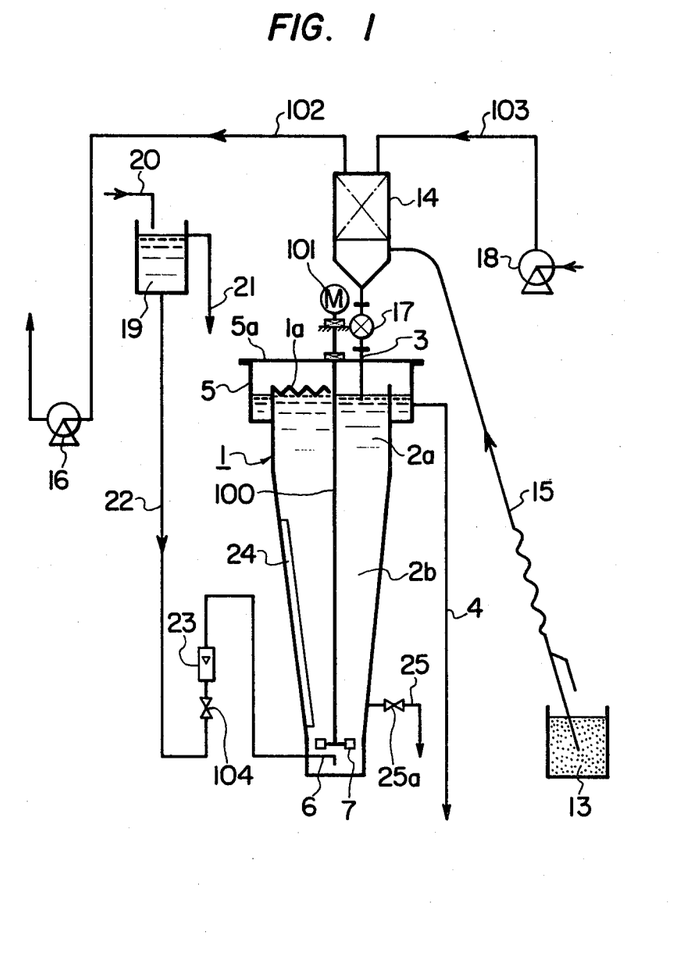
FIG. 1 is a schematic view of the arrangement of several components of the apparatus according to this invention.

In FIG. 1, numeral 1 denotes a main vessel which is so designed and arranged to prepare slaked lime aqueous solution. This vessel 1 is formed with a lower portion 2b which has substantially the shape of an inverted and truncated hollow cone, the inside wall surface thereof serving as a fluidized bed for slaked lime particles, as will be more fully described hereinafter. The upper part 2a of vessel 1 takes the form of a hollow cylinder as shown. An inlet piping 3 opens with its lower end at the top end of the hollow cylinder 2a for introducing the material slaked lime. Around the upper end of hollow cylinder 2a, there is provided an auxiliary overflow-receiving vessel or weir 5, from which an outlet piping 4 extends for discharging the prepared slaked lime solution accumulated in the auxilary vessel 5 to a certain reservoir or utilization point of the solution, although not specifically shown.

Numeral 6 represents a water supply piping which opens in the interior of main vessel 1 and in close proximity to the closed bottom end of the hollow cone portion 2b. The opening end of water supply piping 6 directs downwards for preventing otherwise possible reverse flow of the prepared slaked lime slurry.

In the main vessel 1, there is provided rotatable agitator vanes 7, the form and arrangement of the latter being most preferably of the type of a turbine wheel having two or more vanes. These vanes are positioned most preferably at a slightly higher level than that of the outlet end of water supply piping 6 and at a position as closer possible to the closed bottom of main vessel 1. The purpose of the turbine-like vane arrangement and the closer as possible positioning of these vanes to the vessel bottom reside in the prevention of any accumulation of solids on the vessel bottom during the working period and of any disadvantageous influence of the agitation to upper part of the liquid phase existing in the main vessel.

These vanes 7 are attached fixedly at the lower end of a vertically and centrally arranged drive shaft 100 which extends a small distance upwards from below through top cover plate 5a of the auxiliary vessel 5 and is driven by an electric motor 101 the rotatable part, not shown of which is mounted on top of the shaft 100 and direct-connected therewith, or the motor unit is positioned in the vicinity to the shaft end and connected therewith by a preferably belt-and-pully transmission system, as a preferred embodiment.

As is only schematically and partially shown at 1a, the upper end of wall of the hollow cylindrical portion 2a is formed with a plurality of overflow-allowable notches, or formed generally in a wavy shape for easy overflow of the product, or slaked lime solution.

Numeral 13 denotes a slaked lime supply source, only schematically shown in the form of a container bag in FIG. 1, while numeral 14 represents a bag filter, these both being connected with each other by a conduit 15 which may be at least partially flexible, as is schematically illustrated in the same drawing figure. 16 denotes schematically a suction fan which is connected via a suction piping 102 with bag filter 14.

The lower outlet end of bag filter 14 is connected with supply piping 3 in which a control valve 17 is provided, preferably in the form of a rotary valve, as is schematically shown.

Numeral 18 schematically illustrates an air compressor which is connected via a conduit 103 to bag filter 14 as shown. This compressor may be operated intermittently when dust deposit accumulated on inside surface of bag filter 14 is desired to be removed.

For the necessary water supply to main vessel 1, a water reservoir 19 is provided which is so designed and arranged to feed water at a predetermined constant pressure or at a predetermined constant feed rate. A piping 20 coming from city water mainline, not shown, opens with its downstream end in or at the reservoir 19. For maintaining the water pool in the reservoir 19 at a constant head, the latter is designed as an overflow tank having an overflow piping 21. A water delivery piping 22 is connected to the aforementioned water supply piping 6. A flow control valve 104 and a flow meter 23 are inserted in the delivery piping 22 as shown.

Substantial part of the inside wall surface of inverted cone-like portion 2b is provided with a plurality of baffle bars or the like elongated and inwardly projections 24 which serve for accelerating the agitating and upward flow-generating effects of agitator vanes 7 and at the same time for limiting upwardly moving range of slaked lime particles within the interior of inverted cone chamber 2b, thus limiting the upward travel range of the lime particles.

A solids-discharge pipe 25 extends from the main vessel 1 at a lower level close to the agitator 7. This discharge pipe serves for discharge of insoluble lime particles and contained solid impurities from the interior space of main vessel 1 preferably continuously and together with a small quantity of liquid prevailing in the vessel 1. For this purpose, the pipe 25 is provided with an on-off control valve 25a.

In the following, the operation mode of the apparatus according to this invention will be more fully described by several numerical examples and by way of reference to FIGS. 1 and 6.

Numerical Example 1

The main vessel 1 shown in FIG. 1 was designed to have an effective smallest diameter, as measured at the closed bottom, of 77 mm; and an effective largest diameter as measured at the open top end, of 146 mm. The main vessel was made of transparent polyvinyl chloride and had its effective overall height of 2,460 mm.

At first, control valve 104 was opened until water was conveyed from water reservoir 19 through pipings 22 and 6 into the interior space of main vessel 1 until the latter was perfectly filled with water.

Then, both fans 16 and 18 were operated and control valve 17 was opened until 1.43 kg of slaked lime particles (including 50 wt.% of finely divided slaked lime finer than 63μ) were sucked off from the container through piping 15 into bag filter. The supplied slaked lime 1.43 kg corresponds to a material amount for a continuous two-day running of the plant.

For the scheduled continuous operation, the regulator valve 104 was so adjusted that the water velocity measured at the bottom part of main vessel, having smallest diameter of 77 mm amounted to 0.8 mm/sec. After lapse of 24 hours, the thus prepared slaked lime solution was continuously taken out from top of the main vessel, while the agitator 7 was operated at a peripheral vane speed of 0.6 m/sec. A representative change in the concentration of the thus obtained Ca(OH)$_2$-solution is shown by the curve "A" shown in FIG. 6. As will be seen from this characteristic curve, the concentration is kept at about 2,000 ppm substantially throughout the whole operation.

Numerical Example 2

In this case, the velocity of the supplied water measured nearly at the bottom of main vessel amounted to 0.5–1.0 mm/sec. The rotational peripheral speed of the agitator vanes amounted to 0.25–1 m/sec. Other operational conditions were substantially same as before. The concentration took substantially even level of about 2,000 ppm substantially throughout the continuous operation.

In this case, the heigh range as measured at the fluidizing bed for slaked lime particles was 1,600–1,800 mm.

Comparative Experiment 1

As the solution preparing vessel, a hollow cylindrical vessel, made of polyvinyl chloride resin, was employed. I.D.: 146 mm; Height: 2,460 mm.

The raw material, slaked lime amounted to 1.3 kg. Same as in the foregoing numerical examples 1 and 2, the agitator was operated, only after 6 hours counted from the initiation of plant operation, and at a vane peripheral speed of 0.5 m/sec. The water supply rate nearly at the vessel bottom was set to 0.2 mm/sec, while the product, Ca(OH)$_2$-solution, was continuously taken out from the vessel top.

Figure 6:
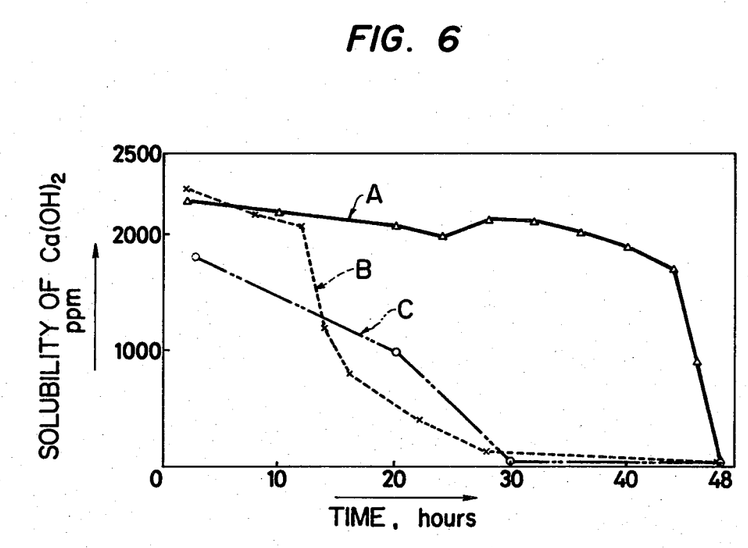
FIG. 6 is a schematic diagram showing the variation of concentration of the product liquid solution as occurring during an extended time of the operation, and in a comparative manner with preferred prior art technique.

The concentration of Ca(OH)$_2$ was seen to take the variation curve shown at "B" in FIG. 6. As seen, the curve showed a sudden drop upon lapse of about 12 hours from the initiation of the plant operation. This phenomenon is thus highly disadvantageous for obtaining a substantially constant concentration of the Ca(OH$_2$)-solution.

Comparative Experiment 2

In this case, a hollow cylindrical vessel, of I.D. 146 mm; and height of 2,460 mm, was used and a wire guaze net was fixed to the bottom of the vessel.

As the material, 1.3 kg of slaked lime were used. No agitator was used.

The water was supplied nearly at the vessel bottom as before, and at a flow velocity of 0.2 mm continuously.

The product, Ca(OH)$_2$-solution was continuously taken out from vessel top continuously as before.

The concentration variation in this case is illustrated by the curve "C" shown in FIG. 6. In this case, a substantially linear slow-down was observed.

Figure 2:
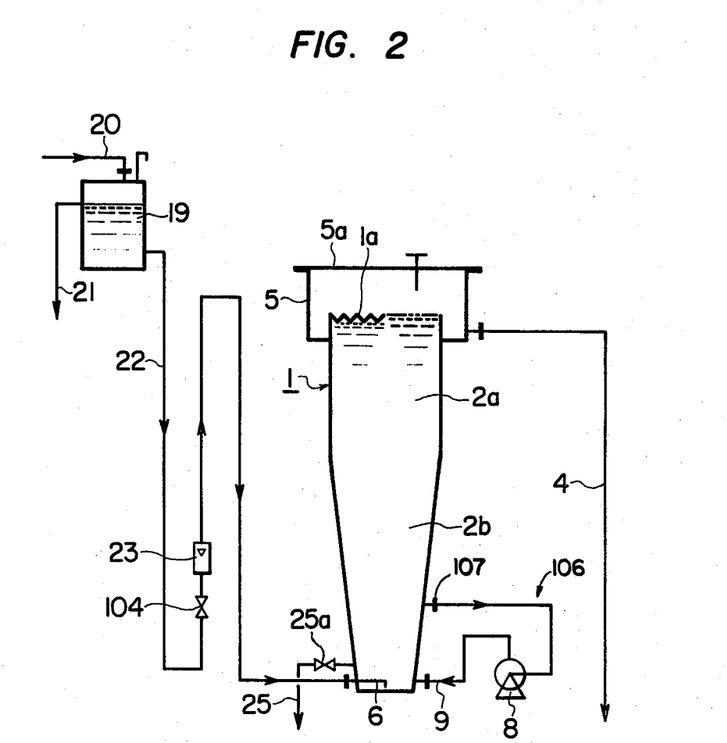
FIGS. 2-4 represent several modifications from the arrangement of the first embodiment of the invention shown in FIG. 1.

In the modification shown in FIG. 2, the mechanical agitator has been replaced by a fluid circulation type agitator. The fluid circulation circuit is shown at 106, including a circulation pump 8 and a discharge piping 9. Numerical 107 denotes suction piping.

With this circulating means 106, a part of the liquid contained in the main vessel 1 is sucked at a certain height thereof through suction piping 107, after the pump 8 has been operated, and returned again to the vessel at a level in close proximity of the vessel bottom through the delivery piping 9. With this circulation means 106, the liquid and solid particles are sufficiently mixed. Although the fluidizing bed has been dispensed with, it may be fitted again if necessary. The solid-liquid mixture is thus agitated so as to produce a clear Ca(OH)$_2$-solution. In addition, the water supply piping 6 may be incorporated with the circulation circuit with slight modification applied thereto. Although the open end of the delivery piping 9 may be single as shown, a manifold-like multiple inlets can be employed, although not shown.

With the above modified arrangement, enough agitation and liquid turbulent flow can be effectively attained.

Other parts are generally similar with those which have been shown and illustrated in the first embodiment, as being identified with respective same reference symbols.

Figure 3:
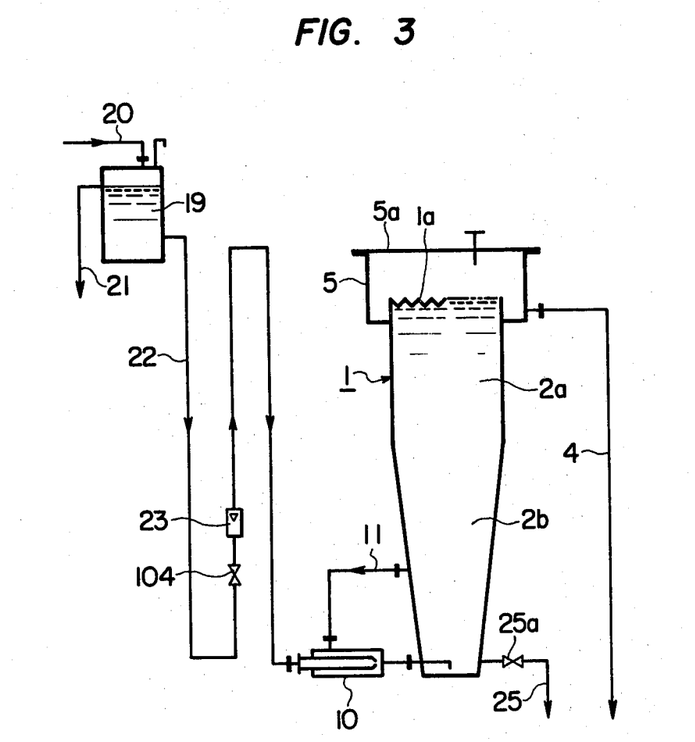

In a further modification shown in FIG. 3, a water ejector 10 has been employed for the purpose of liquid-solids agitation. This ejector 10 is inserted in the foregoing water supply 23. An included suction piping 11 extends from a certain level of main vessel 1 to the outer portion of the ejector. The ejector delivery side is so constructed and arranged in the similar manner to the water delivery piping 6.

Other main parts are substantially similar with those which have been embodied in the first embodiment shown in FIG. 1.

As for the operation of the present modification, it can be easily understood from the foregoing description and by consultation with reference numerals shown. If necessary, water ejector system may be provided in plural for enough agitation and flow-information in the main vessel. Fluidizing bed may also be dispensed with. However, if the size of main vessel 1 is enough large, it may also be provided, although not specifically shown and illustrated.

Figure 4:
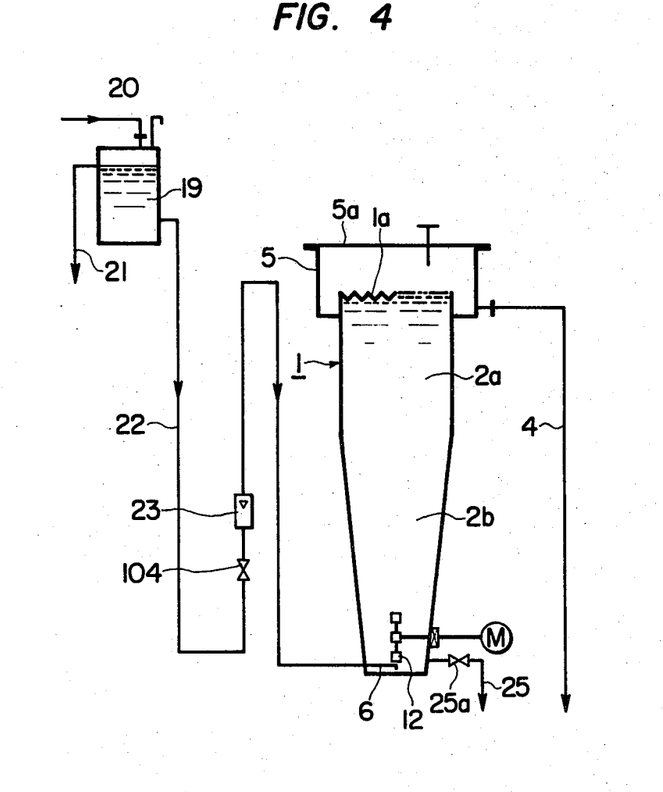

In a further modification from the first embodiment shown in FIG. 1 is illustrated in FIG. 4.

In this case, numeral 12 represents a mechanical agitator of vane type which is, however, arranged on a relatively short, horizontally rotatable drive shaft 100' so as to rotate in a vertical plane. The shaft 100' carries at its outer end of a driving electric motor 101' which is similar to that shown at 101 in FIG. 1. The vane agitator 12 is positioned as before, in close proximity to the bottom of the main vessel 1.

Other parts are similar to those shown in FIG. 1, thus similar respective symbols are adopted in this embodiment.

The function of the present modified agitator is similar with that shown in FIG. 1. Therefore, no further description in this respect will be necessary.

In each of several embodiments shown in FIGS. 1–4, the slaked lime material is fed from above to the main vessel 1 preparatorily filled with fresh water, and the mixture is subjected to strong agitation at a place in close proximity to the bottom of the main vessel, while fresh water is continuously being fed thereto, again at a place close to the vessel bottom. Alternatively, the vessel can be first filled with slaked lime, followed by filling with water. The operation is carried out until whole of the charged lime has been substantially completely dissolved, while the product. Ca(OH)$_2$-solution is continuously taken out at the vessel top. When the concentration of the formed solution begins to drop, the operation is provisionally ceased and an amount of new material of slaked limed is charged and the operation is restarted.

Figure 5:
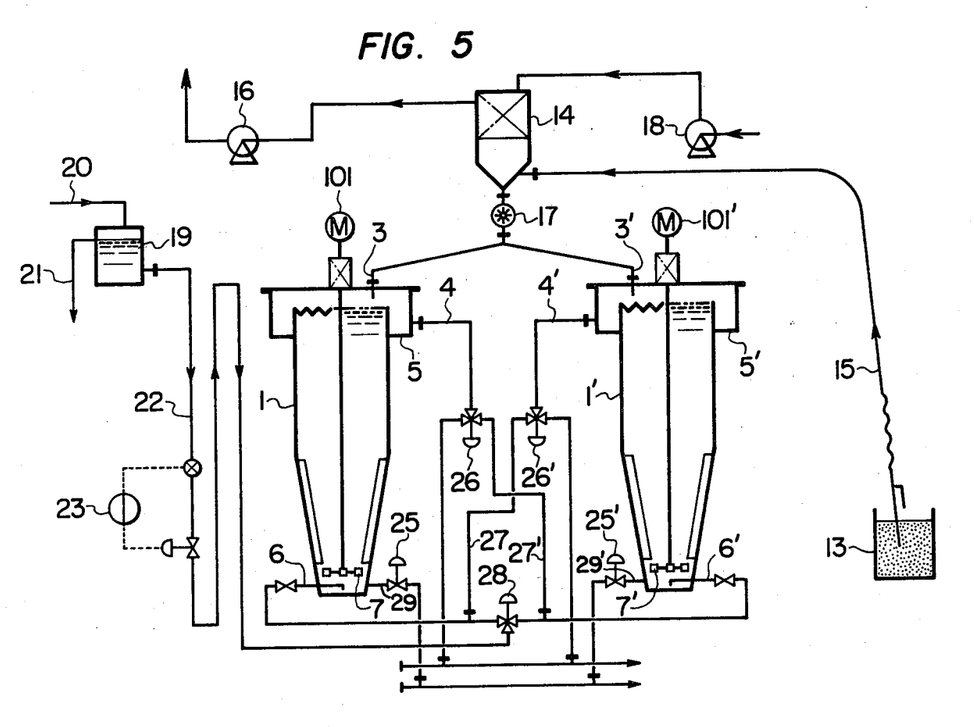
FIG. 5 is a schematic view of an arrangement in which two main vessels are used, and indeed, in a see-saw game manner.

In the most preferable arrangement is shown in FIG. 5.

In this arrangement, two sets of main vessels 1 and 1' are arranged in such a manner that these both are operated in a seesaw game mode.

Main vessels 1 and 1' are fitted with water supply pipings 6 and 6', respectively. At a substantially same level therewith, insolubles discharge pipings 29 and 29' are arranged. At a slightly higher level than that of the outlet ends of water supply pipings 6; 6', mechanical agitators 7 and 7' are provided, respectively.

Numerals 4 and 4' denote product solution discharge pipings through which the formed clear liquid solution can be taken out indirectly from top ends of main vessels 1 and 1' through respective overflow-receiving auxiliary vessels 5 and 5', as before. Change-off valves 26 and 26' are arranged in respective product solution discharge pipings 4 and 4', so as to operate the both vessels 1 and 1' in the seesaw game manner. Numerals 3 and 3' represent respective supply inlets to main vessels 1 and 1', which are connected through a common feed-rotary valve 17 to the bottom of a common bag filter 14. The lower portion of the latter is connected by piping to a common container bag 13 which is same in its function as that shown equally with same numeral 13 in FIG. 1.

18 denotes an air compressor as before, while numeral 16 represents a suction fan. The arrangement and function of these units 16 and 18 are same as before.

Water supply to main vessels 1 and 1' is carried out at a predetermined speed or rate and from the common supply water reservoir 19 as before. Numerals 20 and 21 represent similar respective corresponding parts as those which have been described before.

Although the flow rate-regulator 23 has been shown in somewhat different representation in FIG. 5 from the foregoing, it is same in substance as before.

The water supply pipe line 22 is arranged to be common to the both main vessels. More specifically, pipe line 22 is connected through change-off valve 28 to water supply pipings for optionally and alternately selected water supply to either main vessel 1 or 1'.

It is now assumed that the first main vessel 1 is under operation. When further assumed that the change-off valve 26 is so controlled that product solution passes to another water supply piping 6' attributed to second main vessel 1', the whole combined plant can be so operated that product solution from the first main vessel will be taken out from tank top of second main vessel 1'.

In the alternative operation mode, another corresponding control valve 26' may be so controlled that product solution from second main vessel may be continuously taken out from the tank top of first main vessel 1 and after passage through respective pipings 4', 27 and 6.

Such series operation may be adopted in a long-run operation and indeed at a later stage thereof. The reason thereof is such that in a long-run operation of either of main vessels, the product solution may become lean by virtue of increasingly consumed amount of the charged material of slaked lime. By adopting such series operation, this possible disadvantage can be remedied.

Naturally, when either control valve 26 or 26' has been adjusted to its opposite operating position, the product solution may be discharged as such in an independent way from another companion main vessel.

The embodiments of the invention in which an exclusive property or privilege is claimed are as follows:

1. A method for the continuous preparation of an aqueous solution of slaked lime in a vessel, having a lower zone of an inverted truncated cone, and an upper cylindrical zone, said method comprising accumulating provisionally a layer of slaked lime solids on a closed bottom of said vessel; supplying fresh water from outside continuously at a constant feed rate in close proximity to and above said closed bottom wherein the average ascending water velocity measured at the top end of the vessel is less than 1 mm/sec.; agitating mechanically the solids and the fresh water at a same level or slightly higher than said closed bottom with a mechanical agitation means comprising a rotary agitator having a peripheral rotational speed maintained less than 1 meter per second; causing a slurry in the lower zone to move upwardly in hindered flow, without particulate entrainment in the upper zone, the hindered flow being produced by baffle means within the lower zone; and continuously removing from the top of said vessel a substantially clear and saturated aqueous solution of slaked lime by flowing the saturated calcium hydroxide solution to a weir located on the top of the upper zone.

2. The method of claim 1, wherein the peripheral rotational speed is maintained less than 0.5 meter per second.

3. The method of claim 1, wherein the fresh water is fed into the lower zone in a downward direction.

4. The process of claim 1, wherein the circumferential edge of the top of the cylindrical zone comprises a plurality of notches.

5. A method for the continuous preparation of an aqueous solution of slaked lime in first and second vessels connected in series, each having a lower zone of an inverted truncated cone, and an upper cylindrical zone, said method comprising accumulating provisionally a layer of slaked lime solids on a closed bottom of said first vessel; supplying fresh water from outside continuously at a constant feed rate in close proximity to and above said closed bottom of said first vessel wherein the average ascending water velocity measured at the top end of the vessel is less than 1 mm/sec.; agitating mechanically or fluidically the solids and the fresh water at a same level or slightly higher than said closed bottom of said first vessel; continuously removing from the top of said first vessel by flowing the saturated calcium hydroxide solution to a weir located on the top of the upper zone of said first vessel; feeding the calcium hydroxide solution removed from the first vessel to the bottom of the lower zone of the second vessel; and removing a substantially saturated clear calcium hydroxide solution from the upper zone of the second vessel.

6. The process of claim 5, wherein two vessels are used alternatingly.

* * * * *